July 4, 1967

H. P. ZIMMERMANN 3,329,463

CENTER PIVOT RECLINING SEAT

Filed March 28, 1966

INVENTOR.
HERBERT PAUL ZIMMERMANN
BY
William R. Nolte
AGENT

July 4, 1967

H. P. ZIMMERMANN 3,329,463

CENTER PIVOT RECLINING SEAT

Filed March 28, 1966

INVENTOR.
HERBERT PAUL ZIMMERMANN
BY
William R. Nolte
AGENT

INVENTOR.
HERBERT PAUL ZIMMERMANN
BY William R. Nolte
AGENT

July 4, 1967  H. P. ZIMMERMANN  3,329,463
CENTER PIVOT RECLINING SEAT
Filed March 28, 1966  5 Sheets-Sheet 4
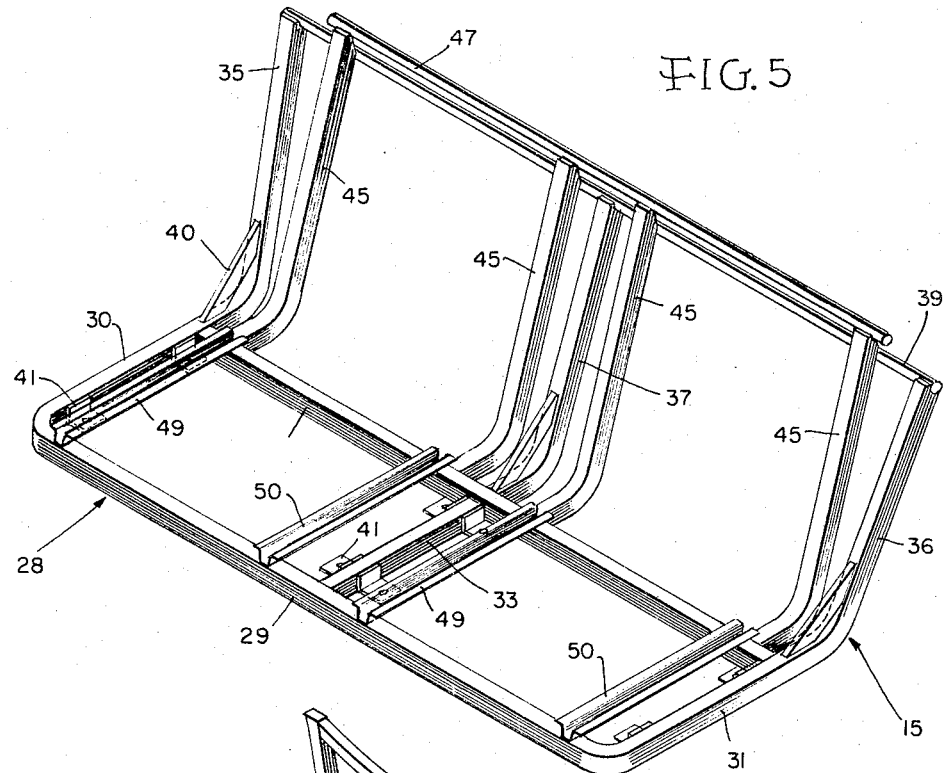
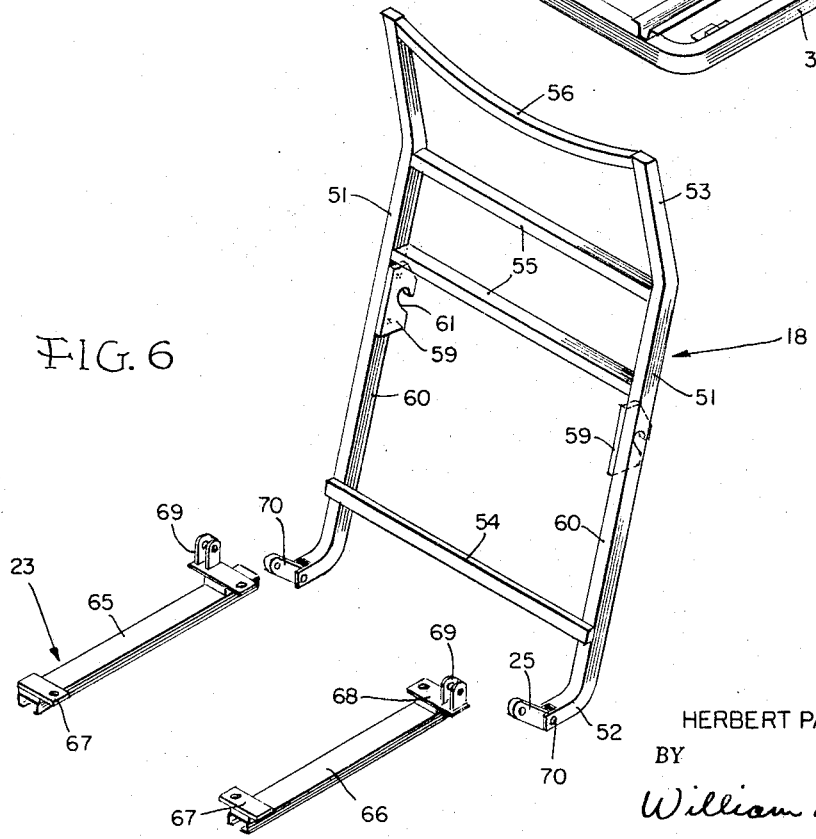
INVENTOR.
HERBERT PAUL ZIMMERMANN
BY
William R. Nolte
AGENT July 4, 1967  H. P. ZIMMERMANN  3,329,463
CENTER PIVOT RECLINING SEAT
Filed March 28, 1966  5 Sheets-Sheet 5

INVENTOR.
HERBERT PAUL ZIMMERMANN
BY
William R. Nolte
AGENT

United States Patent Office 3,329,463
Patented July 4, 1967

3,329,463
CENTER PIVOT RECLINING SEAT
Herbert Paul Zimmermann, New York, N.Y., assignor to The Budd Company, Philadelphia, Pa., a corporation of Pennsylvania
Filed Mar. 28, 1966, Ser. No. 537,798
1 Claim. (Cl. 297—243)

ABSTRACT OF THE DISCLOSURE

Seating apparatus for a rail car in which a plurality of seating units are disposed at predetermined spaced intervals along a longitudinal aisle of a railway passenger car. Each seating unit includes a back cushion which is pivoted about half way up its height. The lower position of the back cushion is linked on both sides to a seat cushion which slides in a track mounted in the base portion of a skeletal frame. The frame includes an upwardly extending back portion which in addition to protecting the back cushion provides a pivot support about which the back cushion rotates.

This invention relates to improved seating for passenger vehicles, and the like, and more particularly to center pivot reclining seats for such passenger vehicles.

In view of the fact that railway, bus and commuter travel is becoming faster from year to year, it might be assumed that marginal passenger space accommodations could be tolerated without serious disadvantage because of the decreased trip time involved. This assumption, however, is not well founded in that most trips now scheduled involve greater distances and the competition between various forms of travel is constantly stressing greater comfort and convenience as basic attractions. It follows therefore that the comfort of passengers constitutes a factor of prime and increasing consideration in passenger seating designs. One area which has heretofore comprised a problem has concerned certain types of passenger vehicle seats which are made to recline and in which the back rests are pivoted at their lower portions to a seat base. The seat cushions in such seating arrangements have in some instances been fixed and in other instances mounted to allow some forward and backward travel. Seating arrangements permitting such backward rotational movements of the back rests have proved to be disadvantageous in that when the back rests are inclined rearwardly the knee and leg room of the rear passengers sitting behind is encroached upon.

Accordingly it is the principal object of this invention to provide an improved transportation chair which avoids one or more of the disadvantages of the prior art arrangements, and which provides an improved measure of comfort.

Another object of this invention is to provide an improved chair of the character described in which the back rest thereof includes a pivotal frame which is articulated with the seat cushion for forward and backward movement.

In accordance with the invention there is provided an improved chair for a passenger vehicle and the like, which comprises a stationary base, a seat member, and track means for enabling backward and forward movement of the seat relative to the base. The base includes an upwardly extending rearward portion which provides support for a back rest. Pivotal movement of the back rest relative to the rearward base portion is accomplished by pivot means located intermediate the top and bottom portion of the back rest and corresponding to an elevation above the knee line of the passenger occupying the seat in the rear. The pivot means are affixed relative to the base and enable the back rest to rotate thereabout, but preclude bodily movement relative thereto. Means are also provided which interconnect the lower swingable portion of the back rest to the seat, such that rotation of the back rest about its pivot, produces a forward and backward rectilinear movement of the seat in said track means affixed to the base.

For a better understanding of the present invention, together with other and further objects thereof, reference is had to the following description taken in connection with the accompanying drawings and its scope will be pointed out in the appended claim.

FIG. 5 is a three quarter front elevational view of the base of the chair unit of FIG. 1 and illustrating its skeletal framework;

FIG. 6 is a three quarter front elevational view of the skeletal framework of the back rest of the chair unit including the base track elements for supporting the seat of the chair unit;

Figure 1:
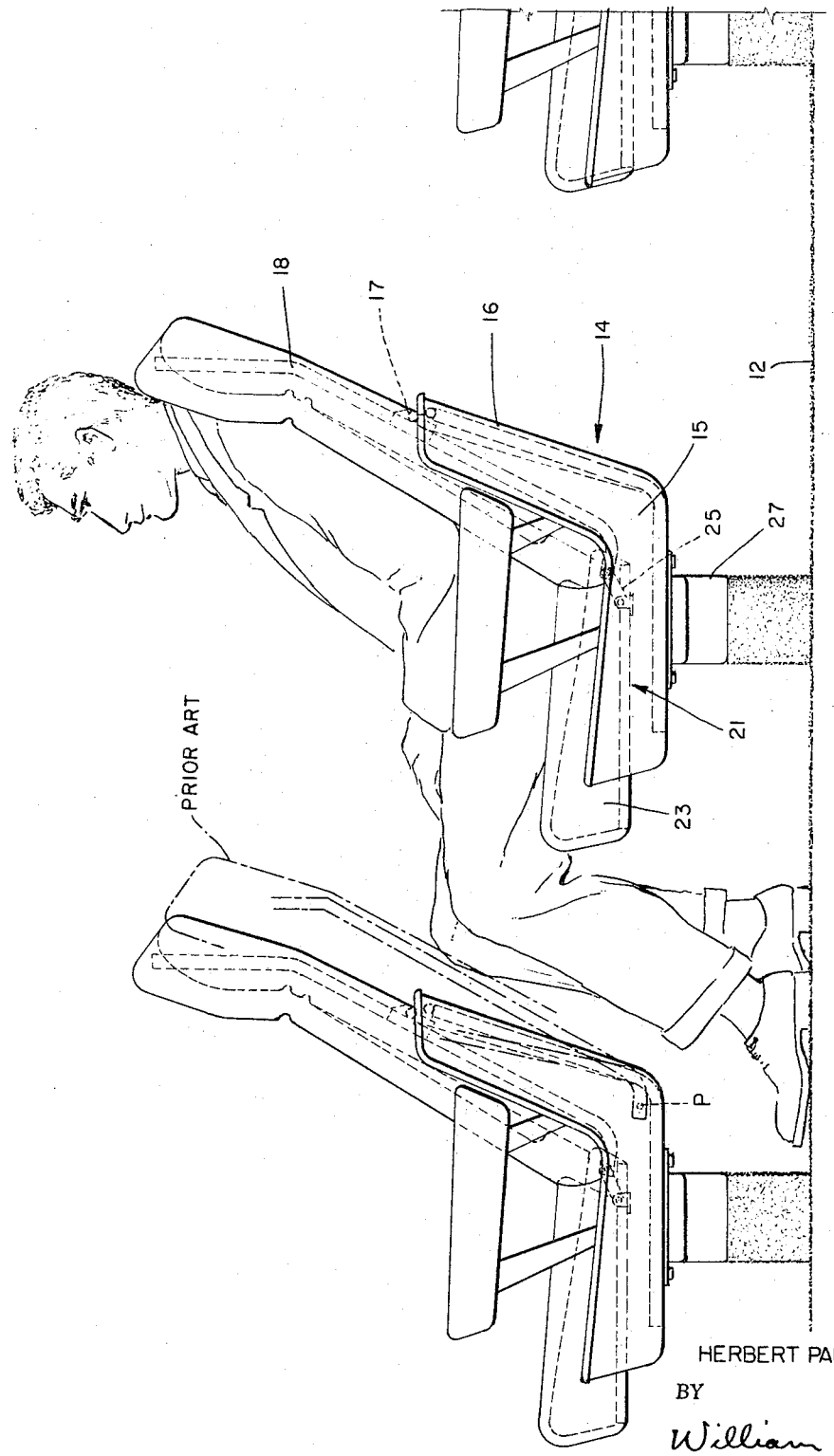
FIG. 1 is a side elevational view taken interiorly of a passenger vehicle showing a plurality of chairs comprising the present invention.
Figure 2:
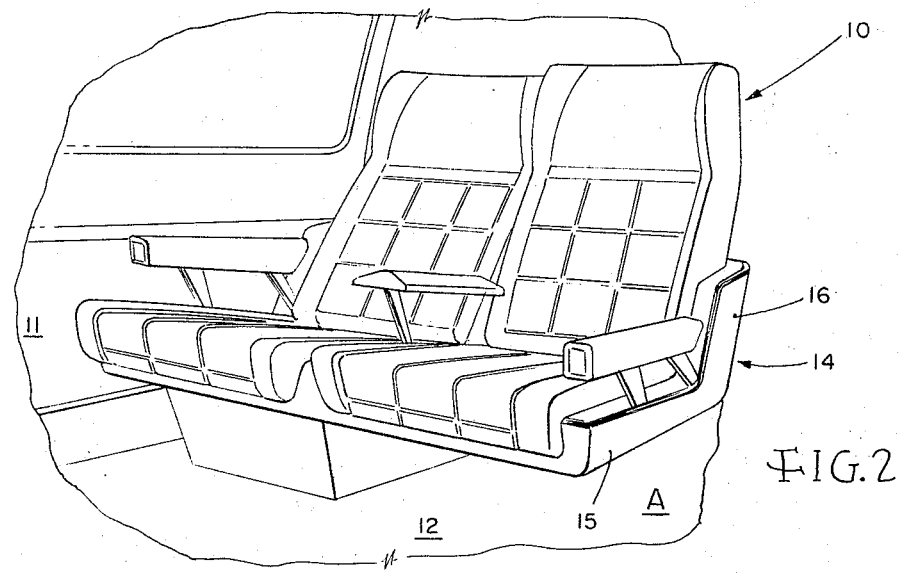
FIG. 2 is a three quarter elevational view of a chair unit illustrated in FIG. 1 and providing accommodations for two passengers sitting in side-by-side relation.

Referring to FIGS. 1 and 2 there is shown a passenger vehicle 10, such as a railway car and the like, having side walls 11 and a floor 12 and a multiple chair unit 14 embodying the present invention. As seen in detail the chair unit enables side-by-side seating of a plurality of passengers. The chair units are arranged transverse to the aisle A while extends lengthwise of the car. As seen in FIG. 1 the prior art arrangements have been such that when a plurality of seat units have been arranged in a fore and aft direction with a construction in which the back rest is enabled to pivot at the bottom, upon reclining rotation of the back rest about pivot point P the backward travel of the back rest R encroaches upon the knee space of the passenger W.

In order to obviate such encroachment and to provide an increased degree of comfort, the present embodiment of the invention includes a seat base 15 having an upwardly extending rear portion 16, and pivot means 17 interconnecting the latter to the back rest 18 of the chair unit. Track means 21 are provided in the base portion and mount seat cushion unit 23 for forward and backward rectilinear movement relative thereto. Link means 25 interconnect the lower end of back rest 18 to the rearward portion of the seat 23. A seat support 27 engages the bottom surface of the seat base 15 and mounts the latter at the proper height above the floor 12 of the passenger vehicle.

With reference now to FIG. 5, the multiple seat base 15 includes a skeletal frame having a generally U-shaped member 28, with a base or front rail 29 and arms 30, 31 contained in a horizontal plane. A rear brace member 32 extends between the arms 30 and 31 in parallel relationship to base length 29. Midway between the arms 30 and 31 there is provided a reinforcing member 33 which interconnects base length 29 with brace member 32. The outer extremities of arms 30 and 31 incline upwardly as at 35 and 36 respectively. In addition, an intermediate upwardly extending member 37, of the same configuration as said latter arm extensions 35, 36 is aligned with member 33, and terminates at its upper end for connection with transverse rod 39 which is tied at its outer ends to the ends of arms 35 and 36.

Gussets 40 are provided to reinforce and interconnect arm portions 30 and 35, 31 and 36 respectively as well as the angular disposed arm portions of member 37. Bracket means 41 are provided on arms 30 and 31 and member 33 to enable the base to be secured to the previously mentioned seat floor support 27 as by bolts 43. A plurality of upright members 45 are disposed intermediate the arms 36, 37 and on each side of arm 37. Each upright member includes a horizontal lower portion which is affixed to the transverse bracing member 32, and includes an upright portion with a greater vertical inclination than the arm portions 35, 36. A transverse horizontally disposed pivot rod 47 interconnects the extremities of each of the upright members 45. The various members aforementioned may be suitably welded or otherwise joined to provide good connection therebetween. A plurality of stationary lower track members 49, 50 having their axes generally aligned with the upright members 45 are disposed in spanning relationship and rest upon the top surfaces of members 28 and 32.

Referring now to FIG. 6 the skeletal frame of the forementioned back rest 18 is shown as including a pair of upright rails 51 having horizontally disposed lower end portions 52, and forwardly bent upper portions 53. The side rails 51 are suitably interconnected by horizontally extending bracing members 54, 55 and a top curved rod 56. Midway up the side rail members 51 there is provided a pair of pivot plates 59 affixed to the inner faces 60 of the members. The plates are notched as at 61 to enable the back rest frame to be supported upon the transverse pivot rod 47 of the frame shown in FIG. 5.

Each seat cushion 23, FIG. 6, of the multiple chair unit includes a pair of movable top track elements 65, 66 which coact in sliding engagement with the aforementioned lower stationary track elements 49. Each of the track members 65, 66 include a forward bracket 67 and a rear bracket 68, the latter having a clevis portion 69 to enable interconnection with the forward end of link 25 as by pin 70, FIG. 9. The rearward portion of link 25 is shown interconnected to the horizontal length of member 52 by a like pivot pin 70.

Figure 7:
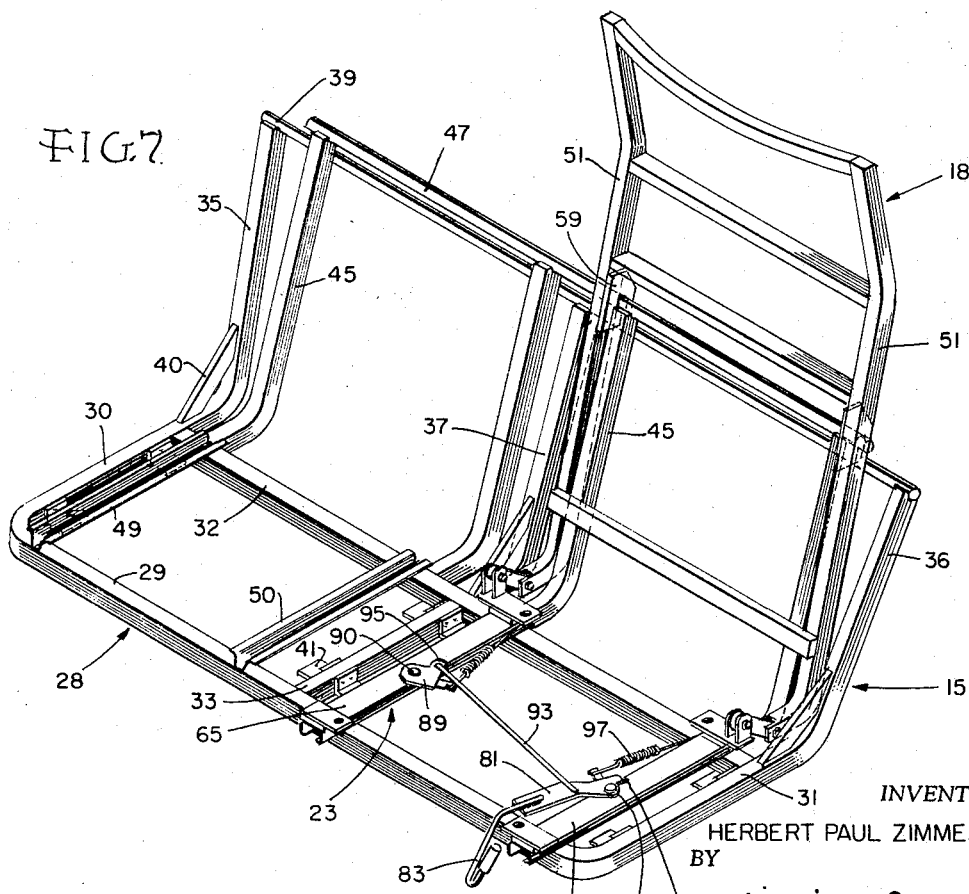
FIG. 7 is a front elevational view showing the framework constituting the back rest illustrated in FIG. 6 assembled on the base framework illustrated in FIG. 5 and including locking means for limiting forward and backward movement of the seat unit of the chair.

With reference now to FIG. 7 the skeletal frame of back 18 is shown mounted on transverse pivot rod 47 by means of pivot plates 59. Correspondingly the track members of seat unit 23 are suitably connected by means of the aforementioned links 25 to the back rest frame 18 and the track elements 65, 66 are in mating engagement with the lower track elements 49, 50 of the seat base 15.

Figure 9:
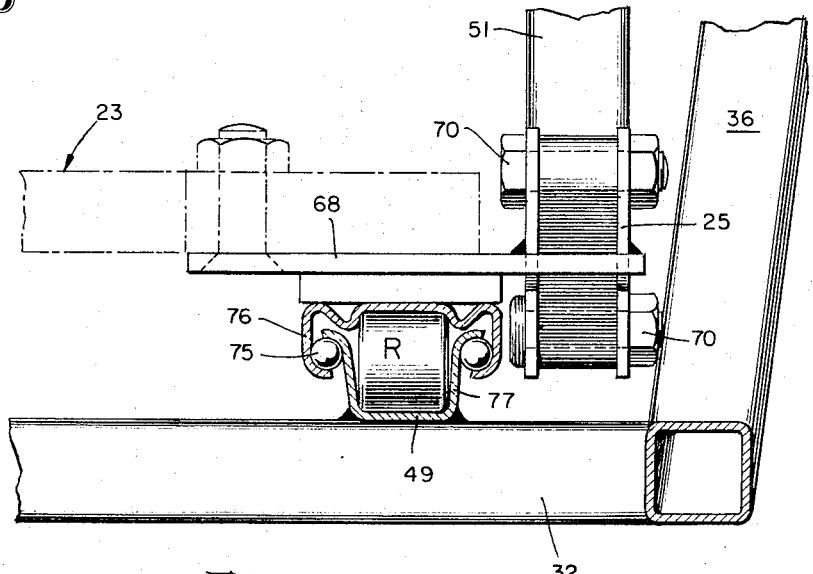
FIG. 9 is a sectional view taken along the line 9—9 of FIG. 8, greatly enlarged to illustrate details of the track means.

With reference to FIG. 9 upper track member 66 is shown in engagement with a roller R which is received in the lower channel track portion 49. A plurality of ball bearings 75 are provided between the downwardly extending flanges 76 of members 66, and between the upstanding arm portions 77 of channel member 50. The latter ball bearings accommodate lateral thrust of the seat cushion unit 23 relative to the fixed base frame 14.

Figure 8:
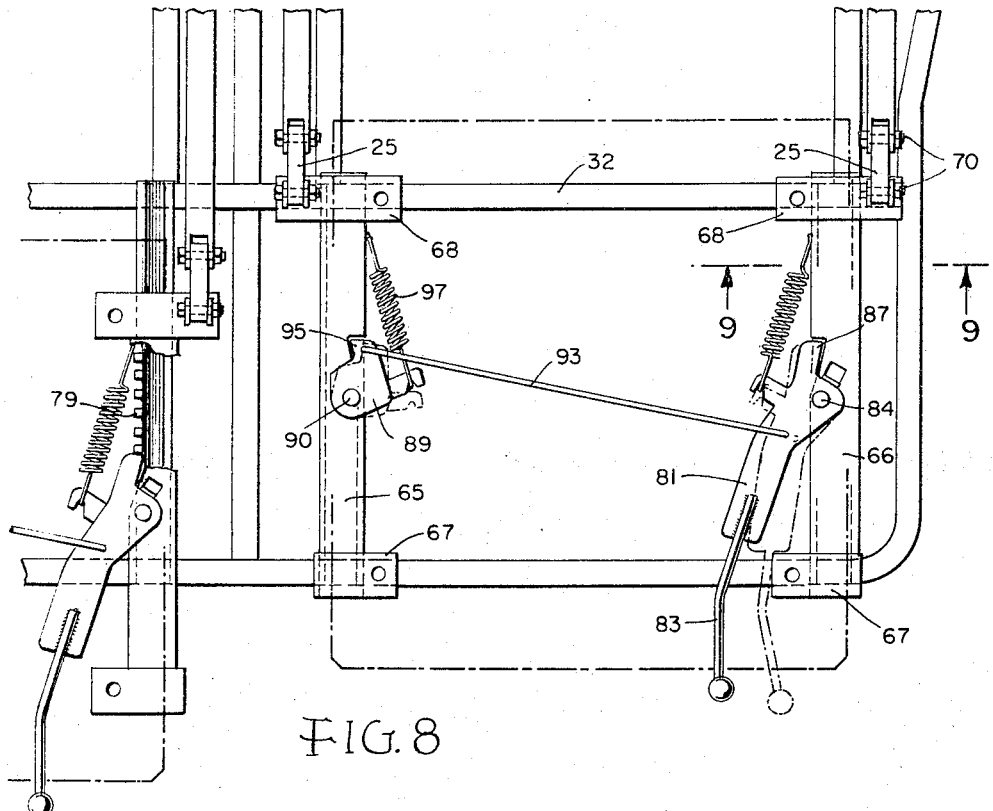
FIG. 8 is a top plan view of a portion of the framework illustrated in FIG. 7 and showing the locking means thereof in various positions.

Referring to FIGS. 7 and 8, means are provided for limiting the forward and aft movement of the seat cushion unit 23 on track means 21, relative to the fixed base frame 14 of the seat unit. For this purpose the lower track elements 49, 50 include toothed portions 79. A bell crank 81, having a lever arm 83, is suitably pivoted as at 84 to the top movable track member 66. The latter track includes a suitable cut out portion as at 87 to enable entry of the forward tongue of the bell crank 81 into engagement with teeth 79 of the lower track member 50. In a similar manner the oppositely disposed upper track member 65 has mounted thereon a bell crank segment 89, for pivotal movement as by pivot 90. A laterally extending rod 93 interconnects bell crank segment 89 with bell crank 81 to cause the same to move in unison. Track 65 is apertured as at 95 to enable the forward end of the bell crank 89 to engage teeth 79 of its corresponding lower track 49. In order to urge the bell cranks into locking engagement with the corresponding lower track elements a pair of springs 97, 97 are provided. With reference to bell crank 81, its forward end is connected to one end of a spring 97, and the opposite end of the spring is suitably secured to base frame member 32. The other spring member 97 of the pair associated with bell crank 89 operates in a similar manner.

Figure 3:
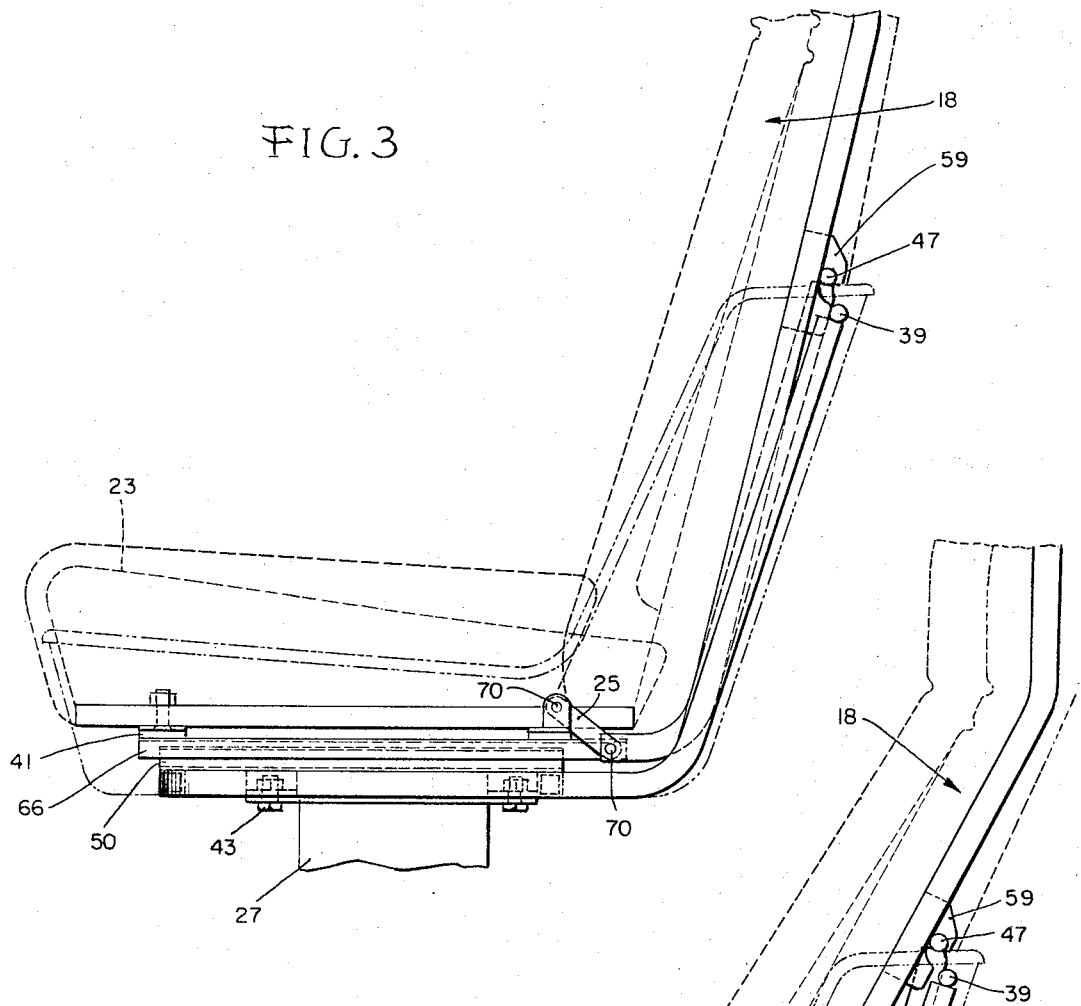
FIG. 3 is a side elevational view of a portion of a chair shown in FIG. 1 greatly enlarged.
Figure 4:
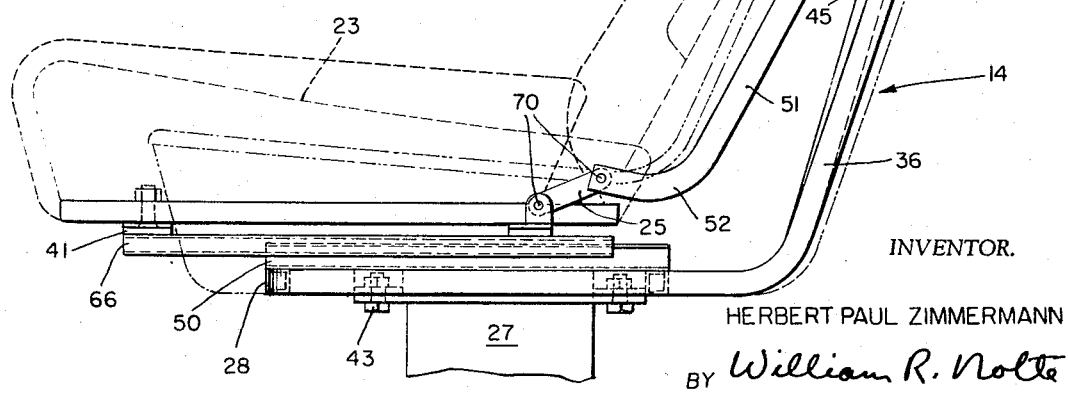
FIG. 4 is a view of the chair unit shown in FIG. 3 but with the seat thereof extended forwardly and the back rest thereof rotated to an inclined position.

From the foregoing description it is observed that the back rest 18 pivots about the fixed pivot rod 47 which is located as seen in FIGS. 1, 3, 4 about half way up on the back rest 18. The lower extremity of the back rest 18 is connected on opposite sides with the links 70 to the lower cushion unit 23. This arrangement is such that when the lower cushion slides forwardly on the track means as previously described, the angle of recline of the back rest changes as a result of its pivoting action about the axis of rod 47 constituting part of the stationary base frame 15.

From the above it is seen that the present embodiment of the invention as described provides a chair construction of improved comfort and one in which the location of the pivot for the back rest is located above the knee line of the rear passenger. As a result, the rear passenger does not lose any space as a result of ingress or egress of passengers from the seat location ahead.

While there has been described what are at present considered to be the preferred embodiments of this invention it will be obvious to those skilled in the art that various changes and modifications may be made therein without departing from the invention and it is aimed therefore in the appended claim to cover all such changes and modifications as fall within the true spirit and scope of this invention.

What is claimed is:

Seating apparatus for a railway passenger car comprising a plurality of seating units disposed at uniformly spaced intervals along a longitudinal aisle of the car, each unit being disposed transverse to said aisle and having a supporting base frame with a horizontally disposed portion, first and second pluralities of arm means extending upwardly from said supporting base frame and disposed in angular relationship to each other, a pivot bar connected to the extremities of said first plurality of arm means, said pivot bar being located at a height corresponding to the knee line of a passenger located in the next adjacent rear seating unit, a horizontal bracing member offset rearwardly and downwardly from said pivot bar and connected to the extremities of said second plurality of arm means, seat means for said horizontally disposed portion of said base frame, means mounting said seat means to said horizontally disposed portion of said base frame for straight line backward and forward movement, back rest means including vertically disposed frame members with pivot plate means disposed on opposite sides of said back rest means defining elongated openings to receive said pivot bar to support said back rest for pivotal movement, link means interconnecting said rearward portion of said seat means to the bottom portion of said back rest means, whereby upon rotation of said back rest means about said pivot bar in one direction, said seat means are moved along said seat mounting means, and upon movement of said back rest means in an opposite direction its rotation and movement of the seat means is limited by said horizontal bracing member.

References Cited

UNITED STATES PATENTS

| | | | |
|---|---|---|---|
| 349,063 | 9/1886 | Shepard | 297—342 |
| 488,773 | 12/1892 | Peck | 297—342 |
| 2,266,897 | 12/1941 | Nordmork | 297—342 |
| 2,627,898 | 2/1953 | Jackson | 297—342 |
| 2,851,083 | 9/1958 | Rhodes | 297—341 |
| 3,027,131 | 3/1962 | Piccione | 248—429 |
| 3,147,947 | 9/1964 | Dall | 248—430 |
| 3,224,808 | 12/1965 | Spielman | 297—341 |

FOREIGN PATENTS 854,249   11/1952   Germany.

FRANCIS K. ZUGEL, *Primary Examiner.*